W. H. MORRIS.
CAMERA OPERATING DEVICE.
APPLICATION FILED SEPT. 18, 1915.
1,209,745.
Patented Dec. 26, 1916.
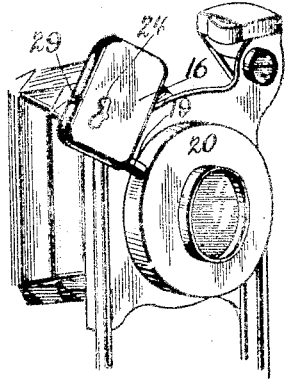
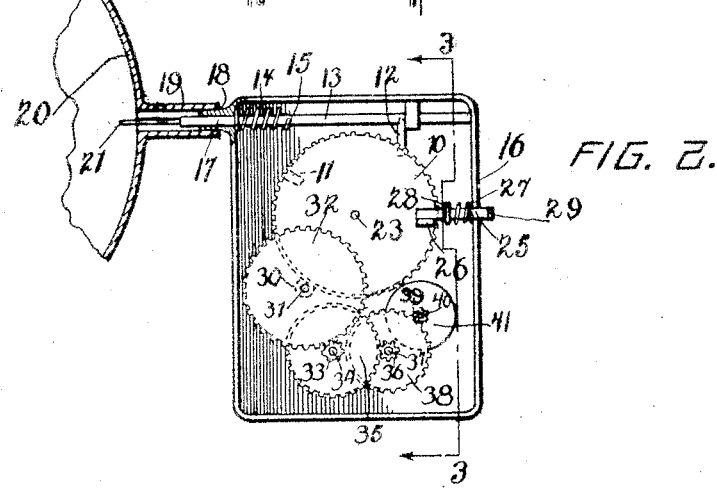
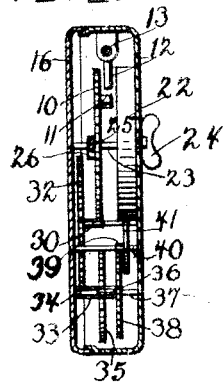
Inventor
W. H. Morris
By Alfred T. Sage
Attorney
Witnesses

UNITED STATES PATENT OFFICE.

WESLEY H. MORRIS, OF RICHMOND, VIRGINIA.

CAMERA-OPERATING DEVICE.

1,209,745.

Specification of Letters Patent.

Patented Dec. 26, 1916.

Application filed September 18, 1915. Serial No. 51,441.

*To all whom it may concern:*

Be it known that I, WESLEY H. MORRIS, a citizen of the United States, residing at Richmond, in the county of Henrico and State of Virginia, have invented certain new and useful Improvements in Camera-Operating Devices, of which the following is a specification.

This invention relates to a camera operating device and particularly to a structure wherein the camera shutter is released after a predetermined time to permit the operator after starting the device to occupy a position within the field of the camera so as to be included in the photograph to be taken.

The invention has for an object to provide a novel and improved construction of actuating means for releasing the camera shutter after a predetermined period comprising a spring actuated rotary member adapted to operate a trip member to release said shutter with means for controlling and retarding the movement of said rotary member.

Other and further objects and advantages of the invention will be hereinafter set forth and the novel features thereof set forth in the appended claims.

In the drawing Figure 1 is a perspective showing the invention applied to a camera; Fig. 2 a side elevation of the device with the casing removed, and Fig. 3 a vertical section thereof on the line 3—3 of Fig. 2.

Like numerals of reference refer to like parts in the several figures of the drawing.

The numeral 10 designates a rotary member or disk having upon one face a lug or projection 11 adapted in the travel of said member to engage a projection 12 extended from the trip rod 13 for the purpose of actuating said rod against the tension of the restoring spring 14 thereon. This spring is secured at its inner end 15 to the rod and bears at its outer end against the inner face of the casing 16. The projecting end 17 of the rod 13 passes through an exteriorly threaded connection 18 by which the casing is secured to the interiorly threaded portion 19 of the lens case 20 from which the usual cable shutter release has been removed. The end 17 of the rod contacts with the usual shutter release member 21 within the lens case for operating said lever.

The rotary member 10 may be driven in any desired manner, preferably by a spring drum 22 located upon the shaft 23 of said member and provided with a winding stem or handle 24 outside of the casing. The member 10 is normally held against rotation by a controlling stop 25 mounted in the casing and disposed to engage a lug or projection 26 upon the opposite face of the member from the lug 11. This stop is retained in holding position by the spring 27 surrounding the same and engaging a collar 28 on the stop and the inner face of the casing. The stop is also provided at its outer end with a hand hold 29 by which it may be withdrawn to permit rotation of the member 10.

Any desired means may be provided for retarding the rotation of the disk so as to allow sufficient time for the operator to reach the desired position in order to be included in the photograph. A convenient means for this purpose is to form the disk as a gear meshing with a pinion 30 on the shaft 31 of a system of resistance or retarding gearing as shown. The shaft 31 is provided with a gear 32 to mesh with a pinion 33 on the shaft 34 which carries a gear 35. The gear 35 in turn meshes with a pinion 36 on shaft 37 which also carries a gear 38 meshing with a pinion 39 on the shaft 40 having thereon a balance wheel 41.

In the application of the invention the usual cable shutter release is removed from the lens case and this device applied at the threaded opening therein. The driving spring having been wound it is only necessary to withdraw the controlling stop to permit a rotation of the disk, during which movement the lug thereon engages and shifts the trip rod to operate the shutter lever within the lens case. This rod is automatically restored as soon as the lug passes the projection thereon, while the controlling stop is automatically projected into the path of its lug when released by the hand of the operator and thus limits the travel of the rotary member to a single rotation. The system of resistance or retarding gearing may be varied in order to time the rotation of this member for any desired period, or other resistance means used.

It will be seen that the invention provides a camera operating device which is simple in construction, economically manufactured, and of such small size that it can be conveniently carried and applied to or removed from any ordinary camera without delay.

What I claim is:—

1. In a camera operating device, a rotary member having actuating and stop lugs upon its opposite faces, means for rotating said member at a predetermined speed, a sliding trip rod provided with a lateral projection to be engaged by said actuating lug, and a sliding controlling stop disposed to engage said stop lug.

2. In a camera operating device, a rotatable disk, a driving spring connected thereto through retarding means, projections upon the opposite faces of said disk, a sliding trip rod provided with an extension adapted to be engaged by one of said lugs, a restoring spring for said rod, a sliding controlling stop adapted to be withdrawn from the path of travel of the other lug upon said disk, and a spring for projecting said stop into the path of said last mentioned lug.

3. In a camera operating device, a rotatable disk, a driving spring connected thereto, projections upon the opposite faces of said disk, a sliding trip rod provided with an extension adapted to be engaged by one of said lugs, a restoring spring for said rod, a sliding controlling stop adapted to be withdrawn from the path of travel of the other lug upon said disk, a spring for projecting said stop into the path of said last mentioned lug, and a system of resistance gearing meshing with said disk to retard the travel thereof.

4. In a camera operating device, a casing provided with a connection adapted for application to a lens casing, a spring actuated rotary member, a trip member extending through said connection and adapted to release a camera shutter, means carried by said rotary member to actuate said trip member, and means for controlling the movement of said rotary member.

5. In a camera operating device, the combination of a lens casing having a cable release connection, of a casing provided with an exteriorly threaded connection adapted for application at said connection, a spring actuated rotary member, a trip rod extended through and beyond said threaded connection and adapted to release a camera shutter, means carried by said rotary member to actuate said trip rod, and means for controlling the movement of said rotary member.

In testimony whereof I affix my signature in the presence of two witnesses.

WESLEY H. MORRIS.

Witnesses:
 COLUMBUS A. CANEPA,
 H. R. CALLIS.